United States Patent [19]

Spear

[11] Patent Number: 5,036,531
[45] Date of Patent: Jul. 30, 1991

[54] LOCAL PSTN INTERCONNECT WITH REMOTE SIGNAL LINK PROCESSING

[75] Inventor: Stephen L. Spear, Skokie, Ill.

[73] Assignee: Motorola Inc., Schaumburg, Ill.

[21] Appl. No.: 485,407

[22] Filed: Feb. 27, 1990

[51] Int. Cl.⁵ .......................................... H04M 11/00
[52] U.S. Cl. ........................................ 379/58; 379/59; 379/63
[58] Field of Search ................... 379/58–60, 379/63

[56] References Cited

U.S. PATENT DOCUMENTS

| | | | |
|---|---|---|---|
| 3,906,166 | 9/1975 | Cooper et al. | 379/59 |
| 4,268,722 | 5/1981 | Little et al. | 379/63 |
| 4,748,655 | 5/1988 | Thrower et al. | 379/60 |
| 4,811,380 | 3/1989 | Spear | 379/63 |
| 4,879,740 | 11/1989 | Nagashima et al. | 379/60 |
| 4,912,756 | 3/1990 | Hop | 379/60 |

OTHER PUBLICATIONS

"Capacity Dynamics in Cellular Mobile Telephone Systems", Telecommunications Magazine, Feb. 1983.

Primary Examiner—Jin F. Ng
Assistant Examiner—Dwayne D. Bost
Attorney, Agent, or Firm—Kenneth W. Bolvin

[57] ABSTRACT

The public switched telephone network (PSTN) (120) is coupled to both the central switch (MSC) (102) and the base station controller (BSC) (101, 110). A call placed to the BSC (101) can be routed to a base station (103–105) by the BSC (101) or to the MSC (102) for routing to the PSTN (120) or another BSC (110). The MSC (102) processes the signalling information routed from the BSC (101). If a call is placed to the MSC (102), the MSC (102) routes the call to the appropriate BSC (101, 110) while also processing the signalling information.

1 Claim, 1 Drawing Sheet

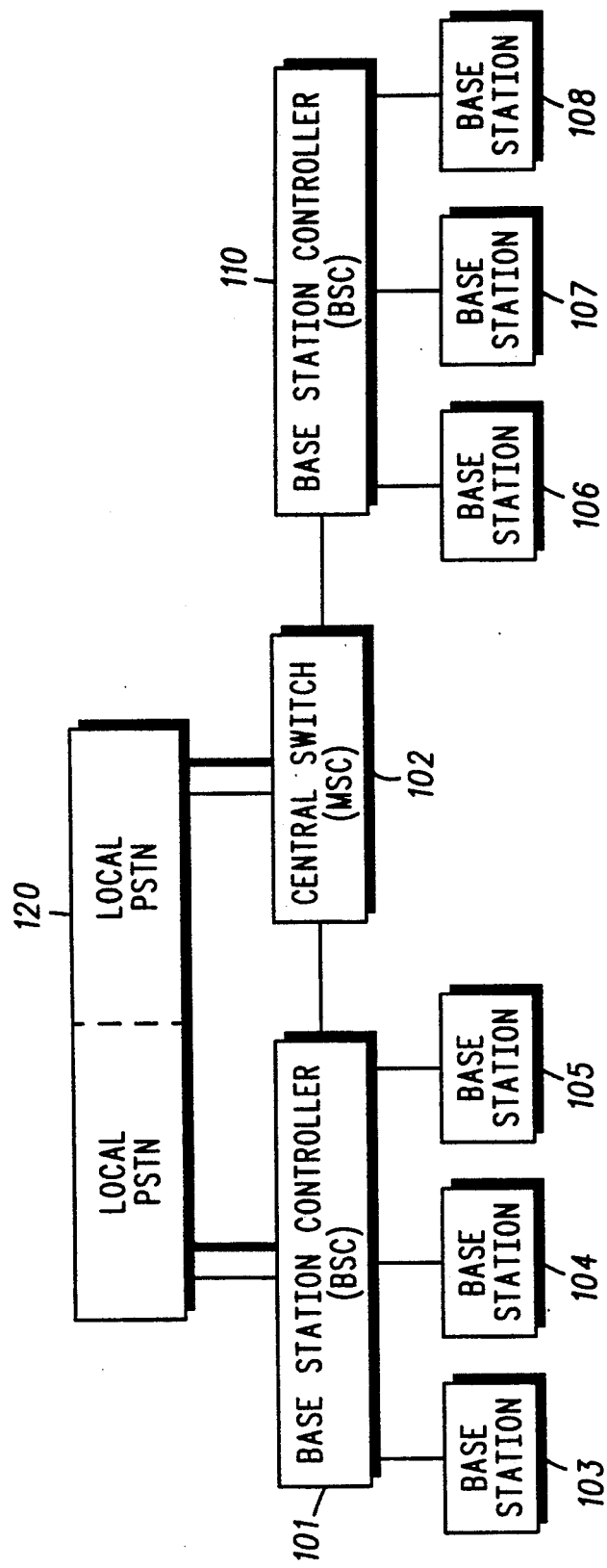

LOCAL PSTN INTERCONNECT WITH REMOTE SIGNAL LINK PROCESSING

FIELD OF THE INVENTION

The present invention relates generally to the field of communications and particularly to cellular radiotelephone switching.

BACKGROUND OF THE INVENTION

One type of cell in present cellular radiotelephone communications systems typically inclues six directional antennas, centrally located in the cell, each radiating into a 60° sector of the cell. Each sector antenna is connected to a base station, the cell's base stations being controlled by the base station controller (BSC). A plurality of these cells is combined to form a cellular radiotelephone communications system that is controlled by a mobile switching center (MSC). This cellular system, covering a geographical area, allows mobile traffic to communicate on public switched telephone networks (PSTN) while moving through the area.

The MSC is responsible for processing telephone calls from the PSTN to the cellular radiotelephone and vice versa. When a call is received from the PSTN, the MSC determines which base station should receive the call and switches the call to that base station, signalling the BSC with control information that a call is to be received. The base station handling the sector of the cell in which the cellular radiotelephone is located will be the base station that receives the call. This base station is determined by the control information.

The MSC must also route the calls coming from the radiotelephone to the PSTN or other radiotelephones. When a radiotelephone call is received, the MSC decides if it is to be routed to a base station if the call is to another radiotelephone or to the PSTN if the call is to a landline telephone.

The BSCs can be located miles from the MSC. This could result in a landline telephone user having to place a toll call to the MSC to reach a radiotelephone that is near the landline telephone user. Similarly, a call from a radiotelephone to a nearby landline user may be routed miles to the MSC to then be connected to the PSTN. There is a resulting need for a local PSTN connection to a cellular radiotelephone system allowing local telephone traffic for both calls from a radiotelephone to a landline telephone and from a landline telephone to a radiotelephone.

SUMMARY OF THE INVENTION

The present invention is comprised of a central switch coupled to the PSTN, at least one base station controller and a plurality of base stations. The central switch routes telephone calls and the signalling information from the PSTN to the appropriate base station controller that in turn routes the telephone call to the appropriate base station. The base station controller is also coupled to the PSTN, allowing the base station controller to route the telephone call directly to the base station, using the central switch only for processing the control information.

BRIEF DESCRIPTION OF THE DRAWINGS

The FIGURE illustrates a block diagram of the present invention.

DETAILED DESCRIPTION OF THE PREFERRED EMBODIMENT

The present invention, by adding switching capability to the BSCs and connecting them to the PSTN, enables landline telephone users to call the nearest BSC to reach a radiotelephone. Similarly, a call from a radiotelephone can be switched to the PSTN through the nearest BSC without having to be routed through expensive transmission facilities to the MSC.

Referring to the FIGURE, the present invention is comprised of a central switch, also designated the MSC (102), at least one base station controller (BSC) (101, 110) and a number of base stations (130-108). Both the MSC (102) and a BSC (101) are coupled to the PSTN (120). More than one BSC (101, 110) can be coupled to the PSTN (120).

An incoming telephone signal from the PSTN (120) to a BSC (101) includes both the voice signal and signalling information that indicates which radiotelephone is to receive the call. This signalling information, which controls where the voice signal is routed and which radiotelephone is paged, is routed to the MSC (102) for processing. The two main methods for routing this information are common channel signalling and channel associated signalling. In common channel signalling, the information is on a separate channel and can be switched through a BSC (101) or combined onto the MSC (102) control channel for the BSC (101). In channel associated signalling, the control information for a number of voice channels is placed on the same channel in place of the voice signal and must be extracted later at the MSC (102) for processing.

If the MSC (102) determines that the voice signal is to be connected to a radiotelephone that is not in the BSC's (101) region, the signal is routed to the MSC (102) which then routes it to the appropriate BSC (101, 110). If the voice signal is to be connected to a radiotelephone that is in the BSC's (101) region, the MSC instructs the BSC which base station (130-105) should get it. The BSC (101) then routes the voice signal to the appropriate base station (103-105) handling the region in which the radiotelephone is located.

An incoming telephone call from the PSTN (120) at the MSC (102) will be routed to the appropriate BSC (101, 110) by the MSC (102). The MSC (102) determines which area the radiotelephone being signalled is located and routes the voice signal to the BSC (101, 110) handling that region. The processing of the signalling information is performed by the MSC (102) in a similar manner as a telephone call to BSC (101, 110) but is not routed since the signalling information is already at the MSC (102).

An incoming radiotelephone call from a radiotelephone to a landline telephone or to another radiotelephone is routed through the BSC (101, 110). The signalling information from the radiotelephone is routed to the MSC (102). If a landline telephone is being called, the MSC (102) may instruct the BSC (101) to switch the call to the PSTN (120) at the BSC (101) if this is the least expensive route. The MSC (102) can also instruct that the call be routed to another BSC (110) or to the MSC (102). If another radiotelephone in the area controlled by the BSC (101, 110) is being called, the MSC may instruct the BSC (101, 110) to switch the call to the appropriate base station (103-108) handling that region. If another radiotelephone, in an area not controlled by that BSC (101, 110) is being called, the MSC (102) instructs the BSC (101, 110) to switch the call to the MSC (102) which then routes the call to the appropriate BSC (101, 110).

Since the BSCs can be located miles from the MSC, expensive transmission facilities are required to route voice signals from the BSCs to the MSC. The present invention enables the voice signal to be handled locally at the BSC while the signalling information is routed to the MSC for processing. The present invention also reduces the burden on the MSC (102) by having the BSC (101, 110) route the call to the base station (103-108). The only time the voice signal must be routed from the BSC (101) is when another BSC is handling the region in which the radiotelephone is located or if it would be less expensive to route the signal to another BSC or to the MSC (102).

I claim:

1. A radiotelephone switching network for switching a voice signal portion of a telephone signal, the telephone signal comprising the voice signal and signalling information, between a first base site of a cell having a plurality of base sites, and a public switched telephone network (PSTN), the radiotelephone switching network comprising:

a) a mobile switching center, coupled to the PSTN, for processing the signalling information to produce a control signal; and b) a plurality of base station controllers, connected to and controlled by the mobile switching center, at least one base station controller connected to the PSTN, each base station controller coupled to and controlling a cell having a plurality of base sites each base station controller connected to the PSTN switching the voice signal between a first base site of a first cell and the PSTN or the mobile switching center, in response to the control signal.

* * * * *